(12) United States Patent
Liu

(10) Patent No.: US 11,573,985 B2
(45) Date of Patent: *Feb. 7, 2023

(54) MISCATEGORIZED OUTLIER DETECTION USING UNSUPERVISED SLM-GBM APPROACH AND STRUCTURED DATA

(71) Applicant: eBay Inc., San Jose, CA (US)

(72) Inventor: Mingkuan Liu, San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/232,919

(22) Filed: Apr. 16, 2021

(65) Prior Publication Data

US 2021/0232606 A1 Jul. 29, 2021

Related U.S. Application Data

(63) Continuation of application No. 16/138,163, filed on Sep. 21, 2018, now Pat. No. 10,984,023, which is a
(Continued)

(51) Int. Cl.
*G06F 16/28* (2019.01)
*G06F 16/22* (2019.01)
(Continued)

(52) U.S. Cl.
CPC .......... *G06F 16/285* (2019.01); *G06F 16/215* (2019.01); *G06F 16/2246* (2019.01);
(Continued)

(58) Field of Classification Search
CPC .. G06F 16/2246; G06F 16/215; G06F 40/284; G06F 40/211; G06F 40/216; G06F 16/285
See application file for complete search history.

(56) References Cited

U.S. PATENT DOCUMENTS 6,489,968 B1   12/2002  Ortega et al.
7,870,039 B1 *   1/2011  Dom ................... G06Q 30/0623
                                                             705/26.61

(Continued)

OTHER PUBLICATIONS

Advisory Action Received for U.S. Appl. No. 14/861,746 dated Apr. 16, 2018, 3 pages.
(Continued)

*Primary Examiner* — Merilyn P Nguyen

(74) *Attorney, Agent, or Firm* — Holland & Hart LLLP

(57) ABSTRACT

In an example, one or more leaf category specific unsupervised statistical language model (SLM) models are trained using sample item listings corresponding to each of one or more leaf categories and structured data about the one or more leaf categories, the training including calculating an expected perplexity and a standard deviation for item listing titles. A perplexity for a title of a particular item listing is calculated and a perplexity deviation signal is generated based on a difference between the perplexity for the title of the particular item listing and the expected perplexity for item listing titles in a leaf category of the particular item listing and based on the standard deviation for item listing titles in the leaf category of the particular item listing. A gradient boosting machine (GBM) fuses the perplexity deviation signal with one or more other signals to generate a miscategorization classification score corresponding to the particular item listing.

17 Claims, 10 Drawing Sheets

Related U.S. Application Data continuation of application No. 14/861,746, filed on Sep. 22, 2015, now Pat. No. 10,095,770.

(51) Int. Cl.
| | | |
|---|---|---|
| *G06F 16/215* | (2019.01) | |
| *G06F 40/211* | (2020.01) | |
| *G06F 40/216* | (2020.01) | |
| *G06F 40/284* | (2020.01) | |

(52) U.S. Cl.
CPC .......... *G06F 40/211* (2020.01); *G06F 40/216* (2020.01); *G06F 40/284* (2020.01)

(56) References Cited

U.S. PATENT DOCUMENTS

| | | | |
|---|---|---|---|
| 8,676,937 | B2 | 3/2014 | Rapaport et al. |
| 8,996,495 | B2 | 3/2015 | Rehman |
| 9,298,981 | B1 | 3/2016 | Ragnet |
| 9,355,153 | B2 | 5/2016 | Rehman |
| 9,953,358 | B1 | 4/2018 | Robertson |
| 10,095,770 | B2 | 10/2018 | Liu |
| 10,984,023 | B2 | 4/2021 | Liu et al. |
| 2010/0287061 | A1* | 11/2010 | Terheggen .............. G06Q 30/06 705/26.1 |
| 2011/0238534 | A1* | 9/2011 | Yakkala .............. G06Q 30/0641 715/810 |
| 2012/0016873 | A1 | 1/2012 | Mathieson et al. |
| 2012/0030151 | A1 | 2/2012 | Huang et al. |
| 2012/0191745 | A1 | 7/2012 | Velipasaoglu et al. |
| 2014/0019285 | A1* | 1/2014 | Karthik .................. G06Q 30/08 705/26.3 |
| 2014/0229307 | A1 | 8/2014 | Kallumadi et al. |
| 2014/0372253 | A1 | 12/2014 | Arunachalam et al. |
| 2015/0052020 | A1* | 2/2015 | Raman ............... G06Q 30/0627 705/26.63 |
| 2017/0024663 | A1 | 1/2017 | Liu |
| 2017/0083602 | A1 | 3/2017 | Liu |
| 2019/0026356 | A1 | 1/2019 | Liu |

OTHER PUBLICATIONS

Final Office Action received for U.S. Appl. No. 14/861,746, dated Jan. 30, 2018, 8 Pages.

First Action Interview-Pre-Interview Communcation received for U.S. Appl. No. 14/861,746 dated Aug. 25, 2017, 4 pages.

Notice of Allowance received for U.S. Appl. No. 14/861,746, dated Jun. 7, 2018, 12 pages.

Non Final Office Action Received for U.S. Appl. No. 16/138,163, dated Sep. 15, 2020, 13 pages.

Notice Of Allowance received for U.S. Appl. No. 16/138,163, dated Dec. 24, 2020, 8 pages.

\* cited by examiner

700

```
TRAIN ONE OR MORE LEAF CATEGORY SPECIFIC
SLM MODELS 702
            ↓
CALCULATE PERPLEXITY FOR TITLE OF ITEM
LISTING IN RESPONSE TO REQUEST FOR A
MISCATEGORIZATION CLASSIFICATION SCORE
704
            ↓
GENERATE PERPLEXITY DEVIATION SIGNAL 706
            ↓
CREATE TUNING SET OF ITEM LISTINGS 708
            ↓
FEED TUNING SET TO GBM TRAINING
COMPONENT FOR TUNING OF GBM MODEL 710
            ↓
USE GBM TO FUSE PERPLEXITY DEVIATION
SIGNAL WITH ONE OR MORE OTHER SIGNALS TO
GENERATE MISCATEGORIZATION
CLASSIFICATION SCORE 712
```

*FIG. 7*

MISCATEGORIZED OUTLIER DETECTION USING UNSUPERVISED SLM-GBM APPROACH AND STRUCTURED DATA

CROSS REFERENCES

This application is a continuation of U.S. patent application Ser. No. 16/138,163 by Liu, entitled "Miscategorized Outlier Detection Using Unsupervised SLM-GBM Approach and Structured Data," filed Sep. 21, 2018; now U.S. Pat. No. 10,984,023, issued on Apr. 20, 2021; which is a continuation of U.S. application Ser. No. 14/861,746 by Liu, entitled "Miscategorized Outlier Detection Using Unsupervised SLM-GBM Approach and Structured Data," filed Sep. 22, 2015, now U.S. Pat. No. 10,095,770, issued on Oct. 9, 2018; each of which is hereby incorporated by reference in its entirety.

TECHNICAL FIELD

Embodiments of the present disclosure relate generally to gradient boosting machines and, more particularly, but not by way of limitation, to outlier detection for miscategorized items using an unsupervised statistical language modeling and gradient boosting machine approach.

BACKGROUND

Properly categorizing an item listed in a database helps users who may wish to access the item find the item during browsing sessions or searches. However, it can often be difficult for users to properly categorize an item when placing it in the database. For example, sellers or other item listers may list an item for sale by adding item information to an online database. One piece of item information that the user may provide is a category for the item. This, however, can be challenging, especially when the user is not familiar with all possible categories (e.g., leaf categories) available. For example, a seller may know that the item that he is selling is a book, and may be able to select the general category "book" as an item category, but may not know that a deeper category of 19th century historical fiction books is available. As a result, there are a large number of items that are miscategorized.

This can be a significant problem in some areas such as online marketplaces. Miscategorized items often get demoted in a search result page and become hard to sell for the seller. On the other hand, for buyers, unrelated miscategorized items pollute the search result page and make it more difficult for the buyers to find items they really want. Past solutions to finding miscategorized items have suffered from the fact that algorithms used to identify an ideal category for an item are often inaccurate or rely on there being a very small number of possible categories with very strict and defined boundaries. As such, a better solution is desired.

BRIEF DESCRIPTION OF THE DRAWINGS

Various ones of the appended drawings merely illustrate example embodiments of the present disclosure and cannot be considered as limiting its scope.

FIG. 7 is a flow diagram illustrating a method, in accordance with an example embodiment.

Figure 1:
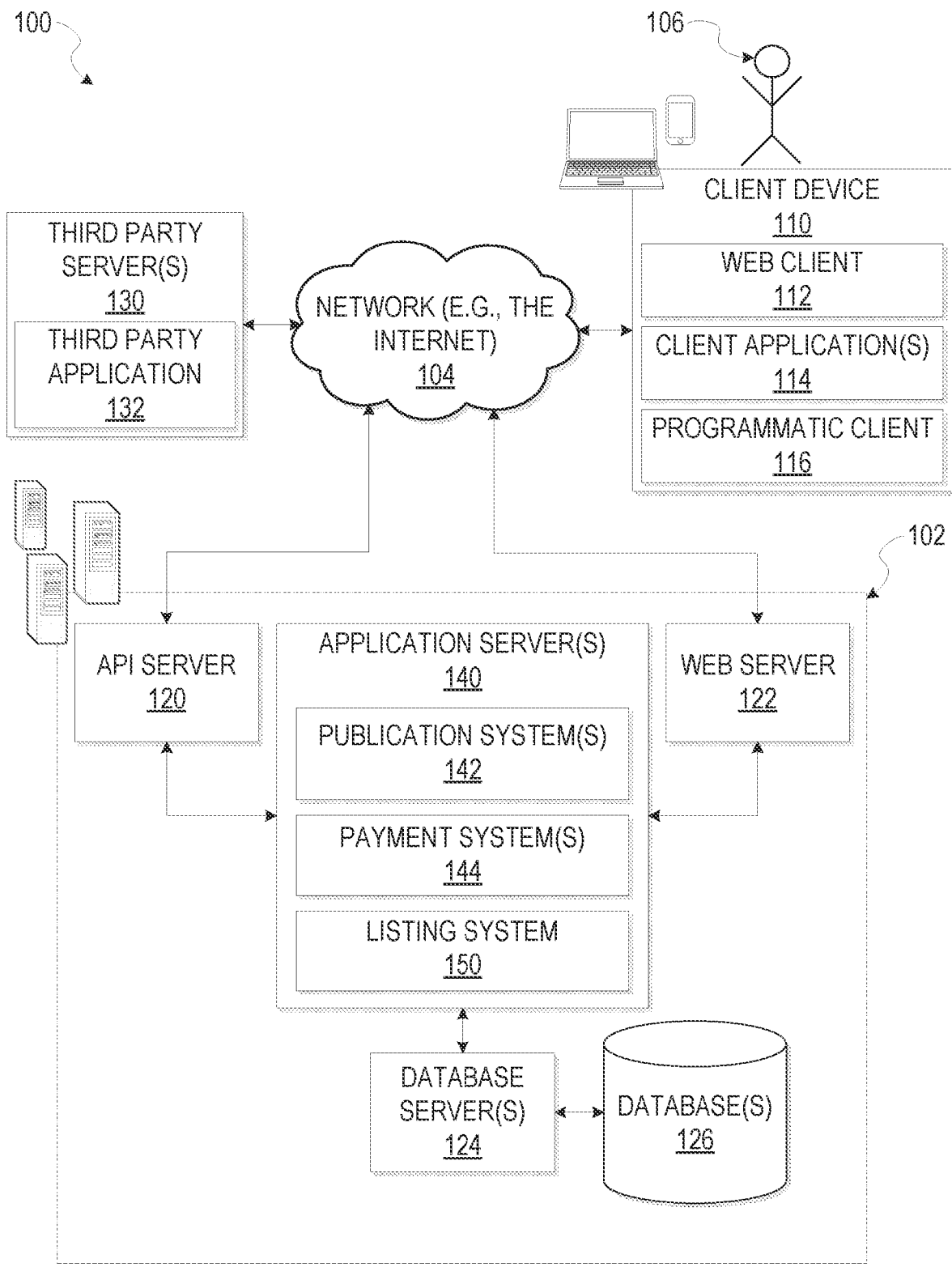
FIG. 1 is a block diagram illustrating a networked system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, an unsupervised SLM-GBM method with aid of structured data is used to solve a miscategorized outlier detection problem for leaf categories in a schema. This method is made up of two major components. A first component is unsupervised SLM, which can derive a deep-featured miscategorization evaluation based on an item's computed title perplexity and its expected perplexity for a given leaf category. This includes both offline training of the SLM model and runtime SLM evaluation using the SLM model. A second component is unsupervised GBM, which fuses traditional shallow features and the SLM-based deep features together to produce a final robust and accurate classifier. This includes both offline training of a GBM model and runtime GBM evaluation using the GBM model.

SLM is a data-driven modeling approach that attempts to qualify a likelihood of a given text input, such as a sentence, listing title, or search query. SLM is able to leverage vast amounts of unsupervised text data (e.g., text data that is unlabeled and thus does not have obvious structured). In an example embodiment, SLM is first used to train a language model for each leaf category (leafCat) based on filtered listing titles, buyer search queries, product name, and so forth, as well as structured data information which contains deep and rich textual features specific to each leaf category. Another leaf category-specific tuning data set based on listing title can be derived in an unsupervised manner. Because both training data and tuning data are derived in an unsupervised way, the SLM approach is scalable to cover all leaf categories. Finally, in this SLM training stage, expected perplexity and its related standard deviation for each leaf category's tuning data can be computed and recorded against the corresponding SLM model.

Category specific SLM can qualify the likelihood of a given sequence of words, such as a query or item title, for given specific category. SLM model can be used to compute probability of a sequence of words. For example, given a sequence of words $w_1, \ldots, w_m$, assuming its length is m. And let's denote the whole sequence probability to be $P(w_1, \ldots w_m)$. And let's denote the conditional probability of an upcoming word using:

$$P(w_T | w_1, w_2, \ldots, w_{t-1})$$

Then, by applying chain rule of probability, the whole sequence probability can be re-rewritten as below formula:

$$P(w_1, w_2, \ldots, w_{t-1}, w_T) = \prod_{t=1}^{T} P(w_t | w_1, w_2, \ldots, w_{t-1})$$

An $(n-1)^{th}$-order Markov assumption can be further applied to simplify the computation of whole sequence probability as below:

$$P(w_1, w_2, \ldots, w_{t-1}, w_T) \approx \prod_{t=1}^{T} P(w_t | w_{t-n+1}, w_{t-n+2}, \ldots, w_{t-1})$$

The results are n-grams and word contexts of n−1 words, such as, for example:

usb charger for iphone 5c new $P(w_t | w_{t-5}^{t-1}) = 0.15$ $w_{t-5}\ w_{t-4}\ w_{t-3}\ w_{t-2}\ w_{t-1}\ w_t$ The probability of $P(w_t | w_{t-1}, \ldots, w_{t-n+1})$ can be calculated based on a n-gram SLM (Statistical Language Model), which can be trained out from a given training text corpus. More generally, Katz back-off SLM may be used, and its parameters can be estimated based on the formula as below $$P(w_t | w_{t-1}, \ldots w_{t-n+1}) = D*C(w_t, w_{t-1}, \ldots, w_{t-n+1}) / C(w_{t-1}, w_{t-n+1})$$

or $$P(w_t | w_{t-1}, \ldots w_{t-n+1}) = \alpha * P(w_t | w_{t-1}, \ldots w_{t-n+2})$$

Where:
C(x)=number of times x appears in training data
D=Good-Turning discounting parameter for $w_t$, $w_{t-1}, \ldots, w_{t-n+1}$
α=back-off weight (utilized if C(x) not higher than a cut-off threshold).

In an example embodiment, a text format such as ARPA is used to store the SLM parameters. In the ARPA format of an n-gram language model, for a sequence, such as "apple iphone" one can get its 2-gram probability by reading off:

$P(\text{iphone}|\text{apple})=0.5555$.

The sentence probability of the sequence is:

$P(\text{apple iphone})=P(\text{apple})*P(\text{iphone}|\text{apple})=$
 $0.2*0.5555=0.11111$.

And similarly, for another word sequence, "samsung iphone" one can get its 2-gram probability by reading off:

$P(\text{iphone}|\text{samsung})=_P(\text{iphone})*BWT(\text{samsung})$.

The sentence probability of the sequence of "samsung iphone" is:

$P(\text{samsung iphone})=P(\text{samsung})*P(\text{iphone} |\text{samsung})=P(\text{samsung})*P(\text{iphone})*BWT$
 $(\text{samsung})=0.2*0.2*0.5555=0.02222$.

The parameters may be stored, for example, as follows:
\data\
ngram 1=7
ngram 2=7
\1-grams:
0.1<UNK>0.5555
0<s>0.41039
0.1</s>1.0
0.2 apple 0.5555
0.2 samsung 0.5555
0.2 iphone 0.5555
0.2 smartphone 0.6349
\2-grams:
0.5555 apple <UNK>
0.5555<s><UNK>
0.5555 apple iphone
0.5555 samsung smartphone
0.5555 iphone <UNK>
0.2778 smartphone </s>
0.2778 apple smartphone
\end\.

In an example embodiment, a category recommendation system uses specific algorithm configurations, tuning parameters, and so forth to train the language model. In an example embodiment, a 3-gram word-level language model using KN smoothing, Katz-backoff, and the Out of Vocabulary (OOV) log probability is set to −7.0.

With reference to FIG. 1, an example embodiment of a high-level client-server-based network architecture 100 is shown. A networked system 102, in the example forms of a network-based publication or payment system, provides server-side functionality via a network 104 (e.g., the Internet or a wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a mobile phone, desktop computer, laptop, personal digital assistant (PDA), smart phone, tablet, ultra book, netbook, multi-processor system, microprocessor-based or programmable consumer electronics system, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for marketplace transactions. One or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 may include one or more applications (also referred to as "apps") such as, but not limited to, a web browser, messaging application, electronic mail (email) application, e-commerce site application (also referred to as a marketplace application), and the like. In some embodiments, if the e-commerce site application is included in a given one of the client devices 110, then this application is configured to locally provide the user interface and at least some of the functionalities of an e-commerce site, with the application configured to communicate with the networked system 102, on an as needed basis, for data or processing capabilities not locally available (e.g., to access a database of items available for sale, to authenticate a user, or to verify a method of payment). Conversely if the e-commerce site application is not included in the client device 110, the client device 110 may use its web browser to access the e-commerce site (or a variant thereof) hosted on the networked system 102.

One or more users 106 may be a person, a machine, or another means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application programming interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or databases 126. In an example embodiment, the databases 126 are storage devices that store information (e.g., publications or listings) to be posted to the publication system 142. The databases 126 may also store digital item information, in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by a third party. The third party website, for example, provides one or more promotional, marketplace, or payment functions that are supported by the relevant applications of the networked system 102.

The publication systems 142 provide a number of publication functions and services to users 106 that access the networked system 102. The payment systems 144 likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment system 144 may form part of the publication system 142.

A listing system 150 provides functionality operable to perform various aspects of listing items for sale using user-selected data. For example, the listing system 150 may access the user-selected data from the databases 126, the third party servers 130, the publication system 142, and other sources. In some example embodiments, the listing system 150 analyzes the user-selected data to perform personalization of user preferences. As more content is added to a category by the user 106, the listing system 150 can further refine the personalization. In some example embodiments, the listing system 150 communicates with the publication system 142 (e.g., accessing item listings) and payment system 144. In an alternative embodiment, the listing system 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication systems 142, payment systems 144, and listing systems 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an offline manner, and to perform batch-mode communications between the programmatic client 116 and the networked system 102.

Figure 2:
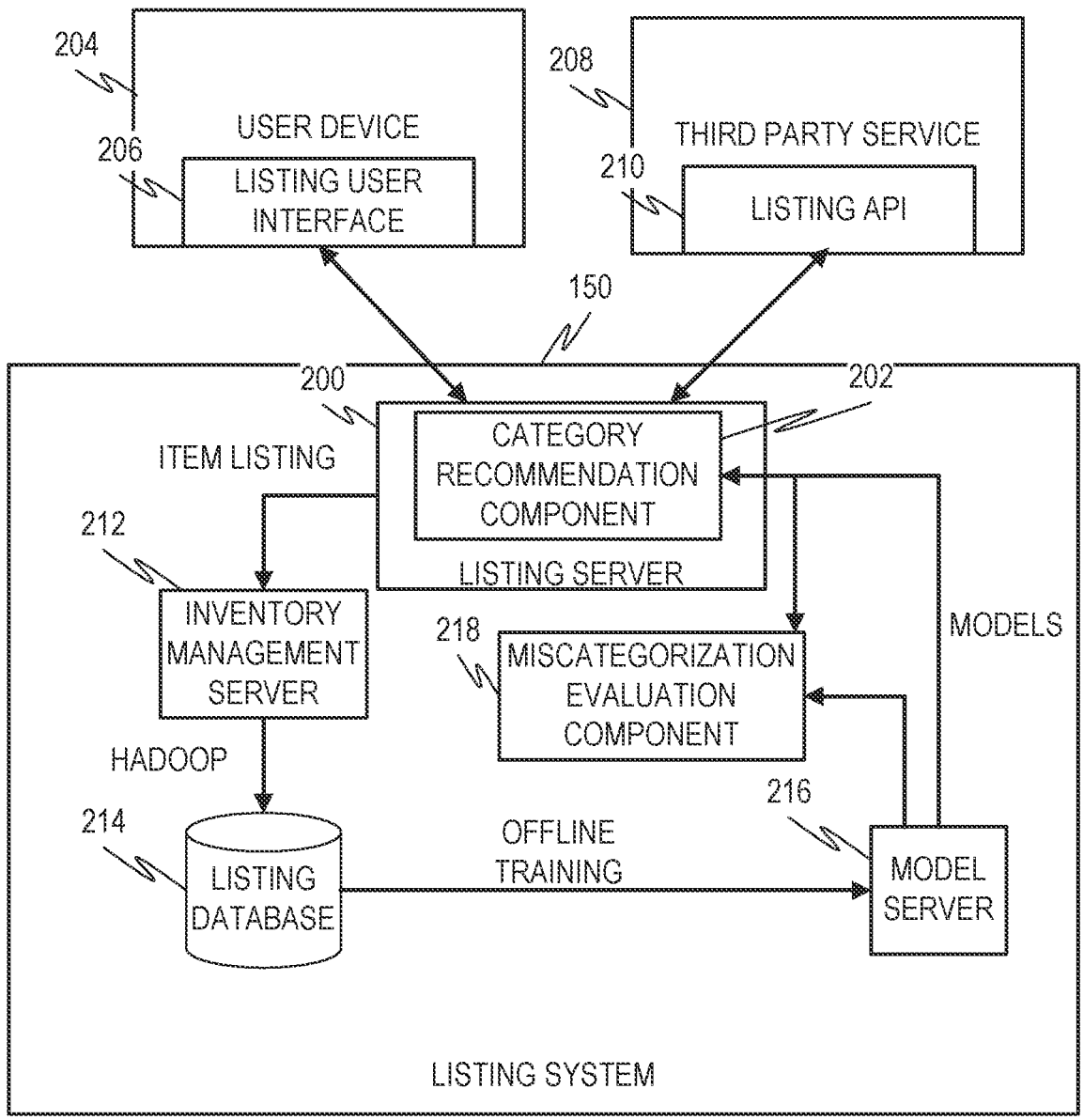
FIG. 2 is a block diagram illustrating the listing system of FIG. 1 in more detail, in accordance with an example embodiment.

FIG. 2 is a block diagram illustrating the listing system 150 of FIG. 1 in more detail, in accordance with an example embodiment. Here, the listing system 150 includes a listing server 200 which acts to perform back-end processes related to the listing of items. The listing server 200 includes, among other components, a category recommendation component 202. A user device 204 may be used directly by a user to list an item for sale by interacting with a listing user interface 206 to provide details of the item for listing. The listing user interface 206 communicates this information to the listing server 200. This process may be interactive in nature. For example, certain inputs by the user, via the listing user interface 206, are transmitted to the listing server 200, at which point the listing server 200 provides feedback, which can then cause the user to alter or add to the listing information provided.

For purposes of this disclosure, the discussion will be limited to the category recommendation aspect of the listing server 200 as implemented by the category recommendation component 202. Here, a user may enter a title or other text input via the listing user interface 206, which may then be passed to the category recommendation component 202. The category recommendation component 202 can then provide an ordered suggested list of categories for the item listing, which the user can then choose from via the listing user interface 206. This process can occur in a number of ways. In one example embodiment, the user is presented with a top n items in the ordered list, and the user can select a button to see an additional n items in the ordered list. In another example embodiment, scores for each of the suggested categories are provided, so the user can see the relative confidence in each of the suggested categories instead of just knowing that a particular category is of a higher confidence score. For example, the user learns that the estimated confidence of the 19th century historical fiction category is 95%, whereas the estimated confidence of the 20th century historical fiction category is only 52% despite the 20th century historical fiction category being second in the ordered list, and thus the user may be more likely to select the 19th century historical fiction category than if the scores were not known.

The listing user interface 206 may take many forms. In one example embodiment, the listing user interface 206 is a web page that is executed by a web browser on the user device 204. In another example embodiment, the listing user interface 206 is a mobile application installed on a mobile device.

The listing server 200 can also be accessed by a third party service 208 via a listing API 210. An example of a third party service 208 is a website that offers to aid sellers in the listing process by listing items on their behalf. The listing API 210 may be specifically designed to interact with the listing server 200 and distributed to multiple third party services 208.

Once a user has selected a category for the listing (due, at least in part, to the category recommendation component 202), the listing server 200 sends the item listing to an inventory management server 212, which manages the process of publishing the listing by storing it in a listing database 214. This may be accomplished via a distributed architecture, such as Hadoop.

A model server 216 then obtains information about listings from the listing database 214 to perform offline training to create or modify the models (including leaf category models) that are used by the category recommendation component 202 when recommending the categories to the user.

In an example embodiment, the category recommendation component 202 makes a call to a miscategorization evaluation component 218, which returns a miscategorization classification score that the category recommendation component 202 can use when deciding which categories to recommend. For example, for each possible category being considered, the category recommendation component 202 calls an instance of a miscategorization process of the miscategorization evaluation component 218 to obtain a score for that possible category, and then the category recommendation component 202 orders the possible categories based on the score for presentation to the user. It should be noted, however, that while the miscategorization evaluation component 218 is depicted in this manner in FIG. 2, in other example embodiments the output from the miscategorization evaluation component 218 can be used by a number of different components in addition to, or in lieu of, the category recommendation component 202.

Figure 3:
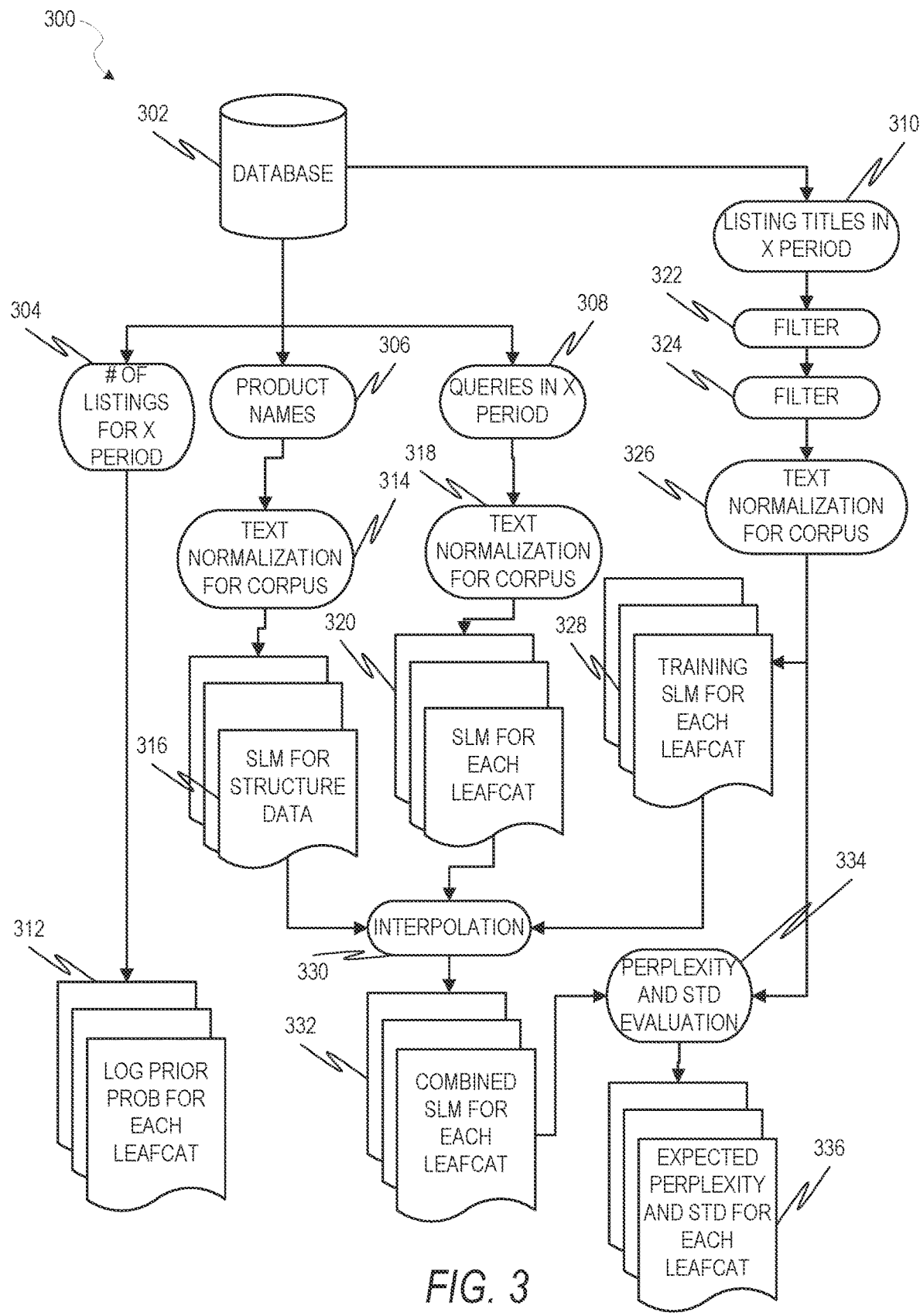
FIG. 3 is a diagram illustrating a statistical language model (SLM) training stage, in accordance with an example embodiment.

Turning now to the operation of the miscategorization evaluation component 218, FIG. 3 is a diagram illustrating an SLM training stage 300, in accordance with an example embodiment. The SLM training stage 300 accesses a database 302 containing item information. As described earlier, this item information may include listing titles, search queries, product names, etc. Various searches may be performed on this database to identify information relevant to the particular leaf category for which the SLM model is being created. Here, four searches have been specified: (1) a number of listings for the leaf category in the recent X period (e.g., 8 weeks) 304; (2) a product name of every item in the leaf category 306; (3) queries performed on the leaf category in the recent X period 308; and (4) listing titles in the recent X period for the leaf category 310. The results of each of these searches is utilized in a different way. For the number of listings for the leaf category in the recent X period 304, this information is used to create a log prior probability for the leaf category 312. This process will be described in more detail below.

For the product name of every item in the leaf category 306, this information is first normalized (e.g., misspellings or alternative spellings are corrected) through text normalization for a corpus 314, and then this information is used to construct an SLM corresponding to the structured data of the leaf category 316.

For the queries performed on the leaf category in the recent X period 308, this information is first normalized (e.g., misspellings or alternative spellings are corrected) through text normalization for the corpus 318, and then this information is used to construct an SLM corresponding to the leaf category 320.

For the listing titles in the recent X period for the leaf category 310, this information is first passed through filters, including a filter 322 and a filter 324. These filters 322, 324 act to narrow down the listing titles to the most relevant. Here, for example, the filter 322 identifies listings in which the seller category selection matched with a top category recommendation for the listing (based on a categorization algorithm). The filter 324, for example, identifies listings that have a lower probability of having been miscategorized by comparing a miscategorization score for each listing to a threshold (e.g., 60 out of 100, where 300 is the highest likelihood of the listing having been miscategorized). In this respect, this process is somewhat recursive since the miscategorization score is derived using a runtime process of the SLM for the leaf category, which is being trained in this stage. Text normalization for the corpus 326 can then be performed to normalize the text of the filtered results. The results of this normalization can be used in two ways. First, an SLM for each leaf category title 328 can be created as part of the training set. Separately, the rest part of results can be used in a tuning set.

The SLM corresponding to the structured data of the leaf category 316, the SLM corresponding to the leaf category 320, and the SLM for each leaf category title 328 can then be interpolated 330 to create a combined SLM for the leaf category 332.

On the tuning set side, the combined SLM for the leaf category 332 and the output of the text normalization for corpus 326 can be used in perplexity and standard deviation evaluation for each listing for the leaf category 334, to create an expected perplexity and standard deviation for each leaf category title 336. This process is repeated for each leaf category.

Turning now to runtime SLM evaluation, when a miscategorization service receives a request at runtime to evaluate a particular item (and estimate the likelihood that the item has been miscategorized), the perplexity of the requested item listing's title is evaluated against its corresponding leaf category's combined SLM for the leaf category 332. Based on how far away this perplexity is from the expected perplexity and the standard deviation derived in perplexity and standard deviation evaluation for each listing for the leaf category 334, a miscategorization evaluation for the item can be derived as a deep feature.

In an example embodiment, sentence perplexity can be calculated as follows. Assume that a sentence S is made up of a sequence of N words such as $\{w_1, w_2, \ldots, w_N\}$. The perplexity of S is computed:

$$PP(S) = P(w_1 \ldots w_N)^{-1/N} = N\sqrt{\prod_{i=1}^{N}\frac{1}{P(w_i \mid w_1 \ldots w_{i-1})}}.$$

For a given leaf category C, there may be M sentences (from the listing title) as the tuning set. These may be marked as $S_1, S_2, \ldots S_M$. For each of these title sentences, its corresponding perplexity can be computed based on the formula above. Then, the expected perplexity value and the related standard deviation value for the given leaf category C, can be found according to the following formulas (note that all the mean_PP and STD_PP values can be precomputed and stored for runtime usage):

$$\text{Mean\_PP}(C) = \text{Mean\_PP}(S_1 \ldots S_M) = \frac{\sum PP(S_i)}{M}$$

$$\text{STD\_PP}(C) = \text{STD\_PP}(S_1 \ldots S_M) = \sqrt{\frac{\sum (PP(S_i) - \text{Mean\_PP}(C))^2}{M-1}}.$$

At a runtime classification stage, deep signals are calculated to measure how far away a given listing has deviated from the assigned leaf category. Assume that a runtime item listing title is T, the seller has placed it under category C, and the item's runtime perplexity is computed as PP(T). Its deviation signal is computed as:

$$\text{Deviation\_PP}(C, T) = \frac{PP(T)}{\text{Mean\_PP}(C) + \alpha * \text{STD\_PP}(C)}$$

where $\alpha$ is a parameter that can be fine tuned (in an example embodiment it is set at 2.0).

Finally, the Mean_PP(C), STD_PP(C), PP(T), and Deviation_PP(C,T) can be fed as deep features into the GBM model along with traditional shallow features such as price, condition, CatReco score, and so forth to produce a ensemble model.

Figure 4:
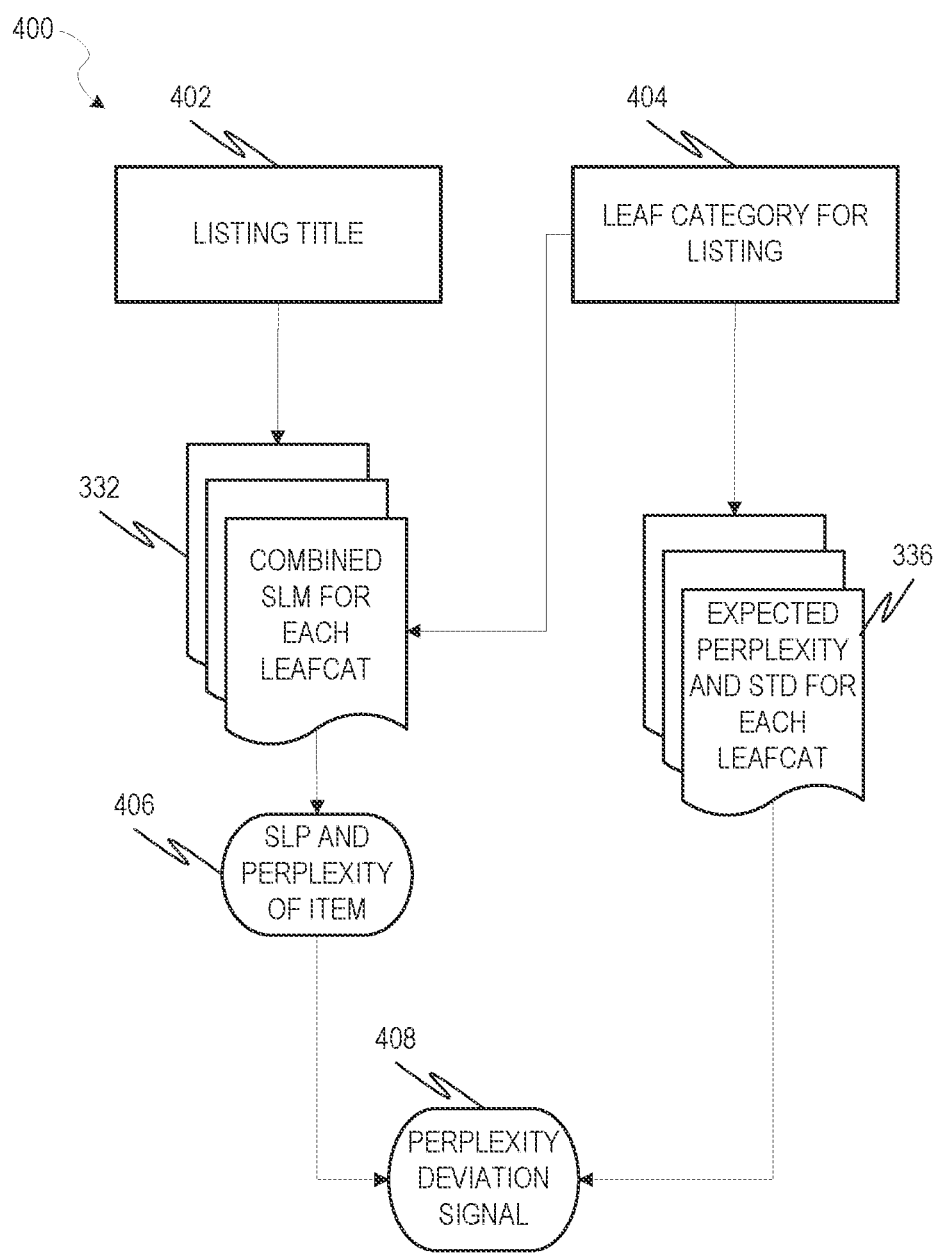
FIG. 4 is a diagram illustrating a SLM evaluation stage, in accordance with an example embodiment.

FIG. 4 is a diagram illustrating an SLM evaluation stage 400 in accordance with an example embodiment. Here, the input includes a listing title 402 and a leaf category 404 for the listing. The leaf category 404 is used to obtain the combined SLM corresponding to it, and the listing title 402 is used as input to the combined SLM for the leaf category 332 to compute a sentence log probability (SLP) and perplexity 406 for the item. The leaf category 404 is also used to retrieve the expected perplexity and standard deviation for the leaf category title 336, which is compared to the SLP and perplexity 406 for the item to create a perplexity deviation signal 408 as a deep feature.

In an offline unsupervised GBM model training process, a set of bootstrapped labeled training data can be derived in an unsupervised manner by checking how category recommendations were selected and the related miscategorized scores. Optionally, a small amount of human-labeled data can also be used to bootstrap the training data set. Once the labeled training data is obtained, a GBM feature input file can be prepared based both on the shallow features and on the perplexity-based deep features from FIG. 4. Then, a GBM training process can be used to train the GBM model.

Figure 5:
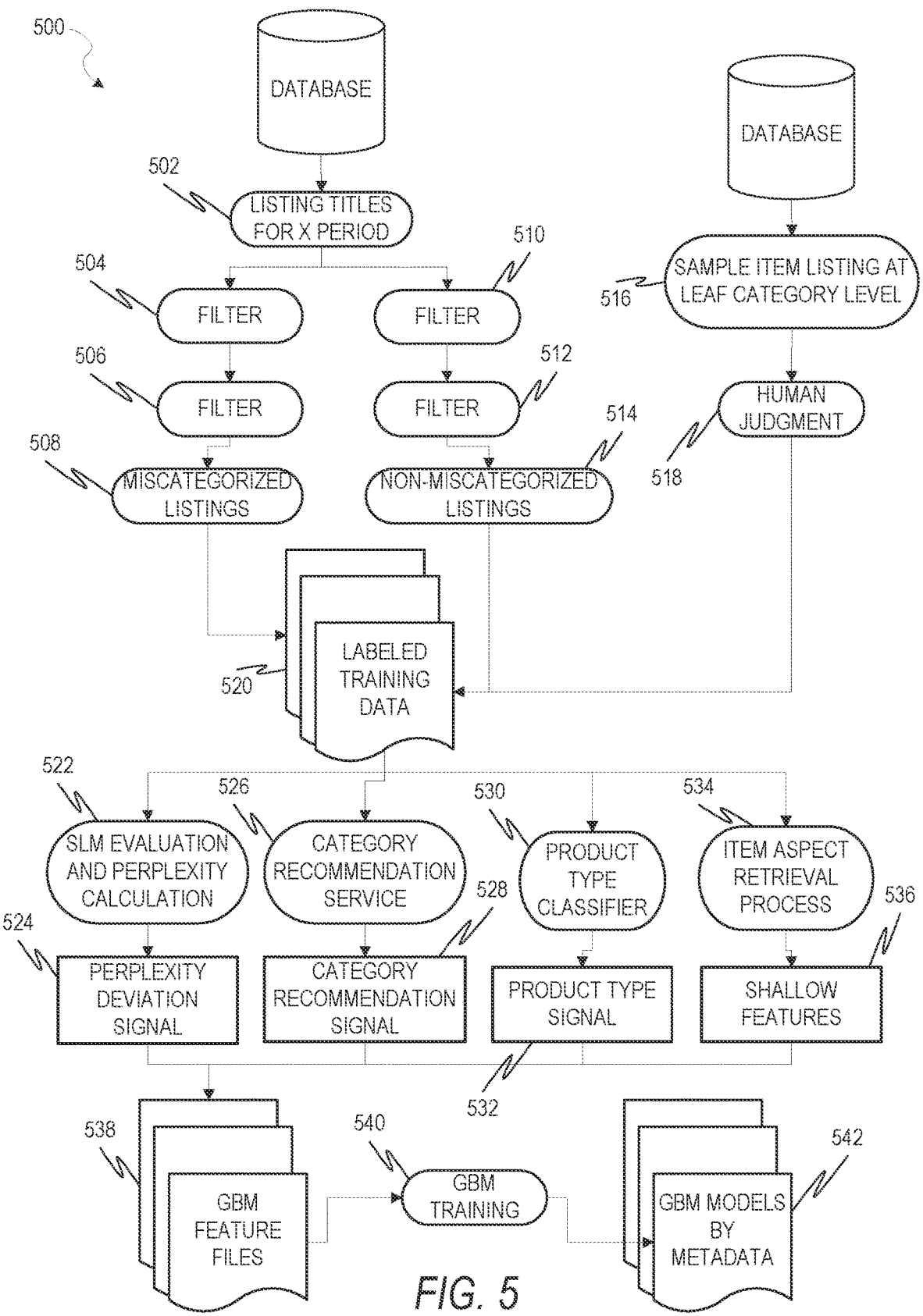
FIG. 5 is a diagram illustrating an offline unsupervised gradient boosting machine (GBM) model training process, in accordance with an example embodiment.

FIG. 5 is a diagram illustrating an offline unsupervised GBM model training process 500, in accordance with an example embodiment. Here, listing titles for the recent X period for each leaf category 502 are obtained. Different filter sets are then applied to this information. A first filter set may include a filter 504, which obtains listings with seller category selections that do not match with a category recommendation algorithm, and a filter 506 which obtains listings with a miscategorized score greater than a first predetermined threshold (e.g., 90 out of 100, meaning a high likelihood that the listing was miscategorized). Listings that fulfil the requirements of one or more of the filters 504 and 506 are labeled as miscategorized 508. A second filter set may include a filter 510, which obtains listings with seller category selections that match a top choice according to a category recommendation algorithm, and a filter 512 which obtains listings with a miscategorized score less than a second predetermined threshold (e.g., 60 out of 100, meaning a lower likelihood that the listing was miscategorized). Listings that fulfil the requirements of one or more of the filters 510 and 512 are labeled as non-miscategorized 514.

Separately and optionally, a sample item listing at the leaf category level 516 can be obtained, and this may be used for a human to make a judgment as to whether or not the item was miscategorized 518.

In an example embodiment, the labeled training data from 508, 514, and (optionally) 518 may be combined into labeled training data 520 to perform up to four separate processes. At 522, SLM evaluation and perplexity computation can be performed on the labeled training data 520 to derive a perplexity deviation signal 524 for each piece of the labeled training data 520, as described in more detail above. At 526, a category recommendation service can create a category recommendation signal 528 for each piece of the labeled training data 520. At 530, a product type classifier can generate a product type signal 532 for each piece of the labeled training data 520. At 534, an item aspect retrieval process can derive other shallow features 536 such as price, condition, and so forth for each piece of the labeled training data 520. The perplexity deviation signal 524, category recommendation signal 528, product type signal 532, and shallow features 536 can be formed into GBM feature files 538 with labeled information by metadata, which can be used as input for GBM training 540, producing one or more GBM models by metadata 542.

Figure 6:
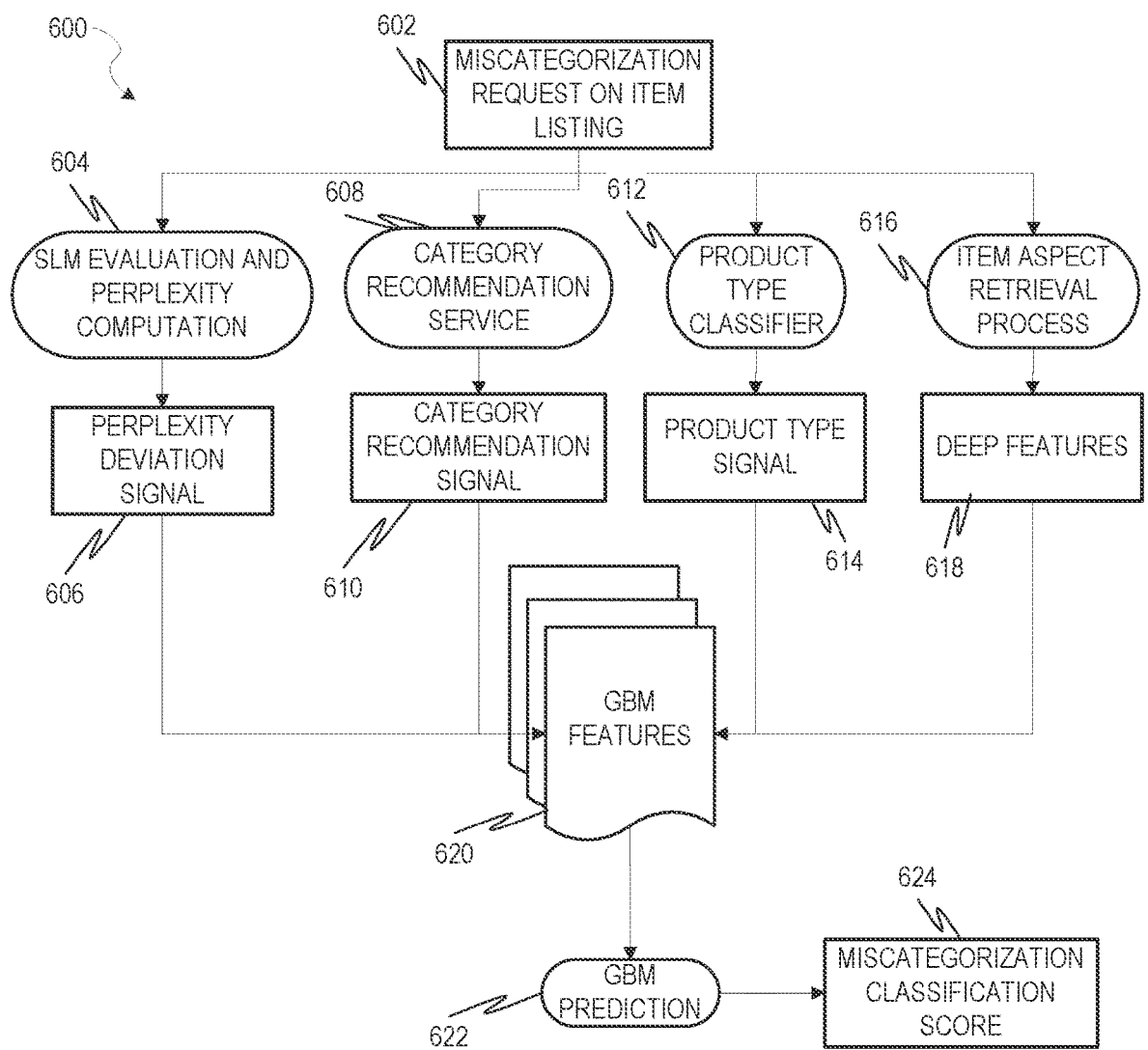
FIG. 6 is a diagram illustrating a GBM-based ensemble classification process, in accordance with an example embodiment.

In a final runtime step, both the deep features of the computed perplexity deviation signals and the traditional shallow features can be fed into a robust GBM-based ensemble classifier to calculate a final accurate miscategorized classification score. FIG. 6 is a diagram illustrating a GBM-based ensemble classification process 600, in accordance with an example embodiment. Here, the input is a miscategorization request on a particular item listing 602. This launches four separate processes. At 604, SLM evaluation and perplexity computation can be performed on the item listing to derive a perplexity deviation signal 606 for the item listing, as described in more detail above. At 608, a category recommendation service can create a category recommendation signal 610 for the item listing. At 612, a product type classifier can generate a product type signal 614 for the item listing. At 616, an item aspect retrieval process can derive other deep features 618 such as price, condition, and so forth for the item listing. The perplexity deviation signals 606, category recommendation signals 610, product type signals 614, and shallow features 618 can be formed into GBM features 620, which can be used as input for a GBM prediction 622, producing a miscategorization classification score 624.

FIG. 7 is a flow diagram illustrating a method 700, in accordance with an example embodiment. At operation 702, one or more leaf category specific SLM models are trained using sample item listings corresponding to each of one or more leaf categories and structured data about the one or more leaf categories. The training includes calculating an expected perplexity and standard deviation for each of the item listing titles. The training may also include generating an SLM for each leaf category for structured data, an SLM for each leaf category's queries, and an SLM for each leaf category's titles, and interpolating the SLM for each leaf category for structured data, the SLM for each leaf category's queries, and the SLM for each leaf category's titles into an SLM for each leaf category. The training may further include generating an expected perplexity and standard deviation for each leaf category based on the SLM for each leaf category and on perplexity and standard deviation calculations for each sample item listing.

At operation 704, in response to a request for a miscategorization classification score corresponding to a particular item listing, a perplexity for a title of the particular item listing is calculated. At operation 706, a perplexity deviation signal is generated based on a difference between the perplexity for the title of the particular item listing and the expected perplexity for item listing titles in a leaf category of the particular item listing, and based on the standard deviation for item listing titles in the leaf category of the particular item listing. At operation 708, a tuning set of item listings may be created by labeling item listings as miscategorized or non-miscategorized based on application of filters to item listings. At operation 710, the tuning set of item listings may be fed to a GBM training component for tuning of a GBM model used by a GBM. At operation 712, the GBM is used to fuse the perplexity deviation signal with one or more other signals to generate a miscategorization classification score corresponding to the particular item listing.

Figure 8:
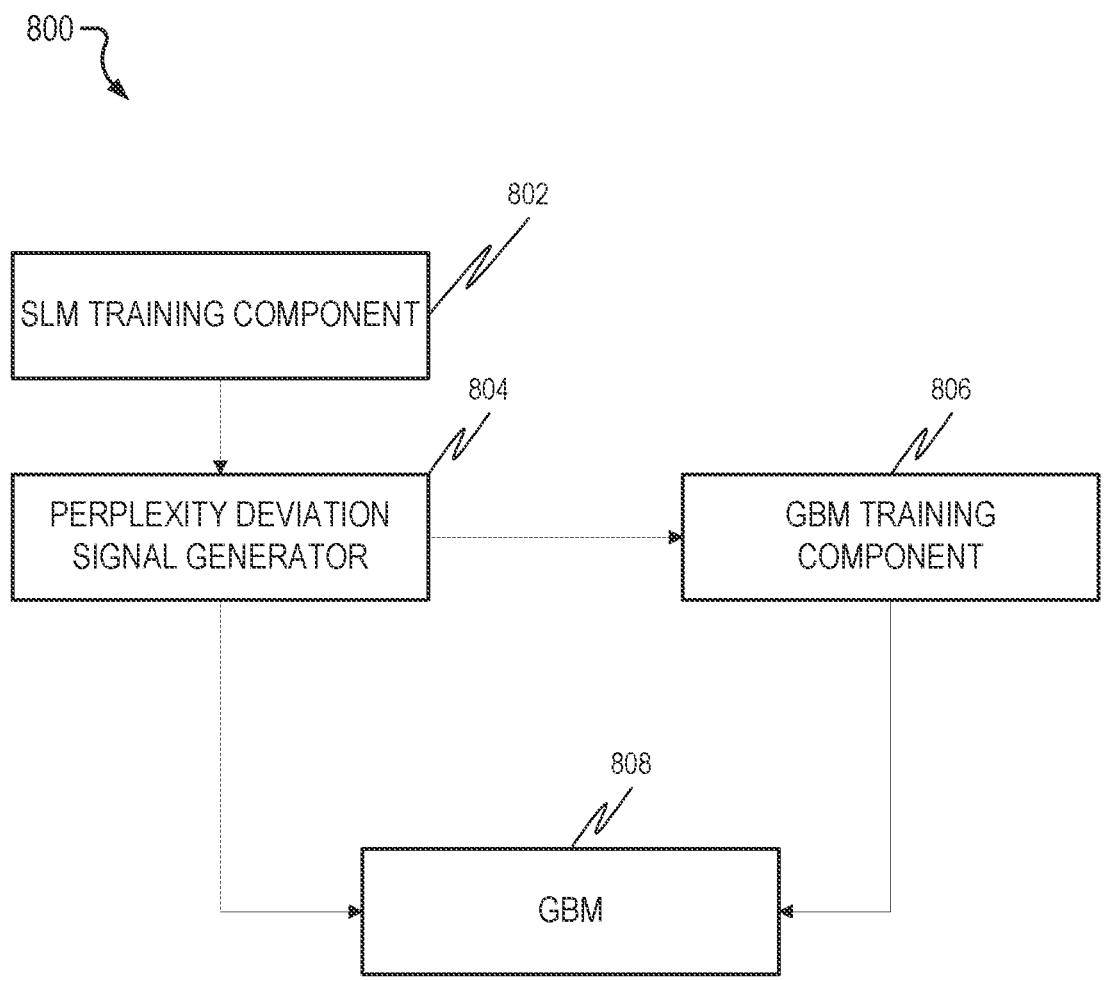
FIG. 8 is a block diagram illustrating a system, in accordance with an example embodiment.

FIG. 8 is a block diagram illustrating a system 800, in accordance with an example embodiment. A statistical language model (SLM) training component 802 is configured to train one or more leaf category specific unsupervised SLM models using sample item listings corresponding to each of one or more leaf categories and structured data about the one or more leaf categories. The training includes calculating an expected perplexity and standard deviation for each of the item listing titles. Thus, the SLM training component 802 performs operation 702 of FIG. 7.

A perplexity deviation signal generator 804 is configured to, in response to a request for a miscategorization classification score corresponding to a particular item listing, calculate a perplexity for a title of the particular item listing and generate a perplexity deviation signal based on a difference between the perplexity for the title of the particular item listing and the expected perplexity for item listing titles in a leaf category of the particular item listing, and based on the standard deviation for item listing titles in the leaf category of the particular item listing, and performs operations 704-706 of FIG. 7.

A GBM training component 806 is configured to create a tuning set of item listings by labeling item listings as miscategorized or non-miscategorized based on application of filters to item listings, and to feed the tuned set of item listings to a GBM component for tuning of a GBM model used by the GBM. The GBM training component 806 performs operations 708-710 of FIG. 7.

A gradient boosting machine (GBM) 808 is configured to fuse the perplexity deviation signal with one or more other signals to generate a miscategorization classification score corresponding to the particular item listing, and generally may perform operation 712 of FIG. 7.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-8 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the subject matter in different contexts from the disclosure contained herein.

Software Architecture

Figure 9:
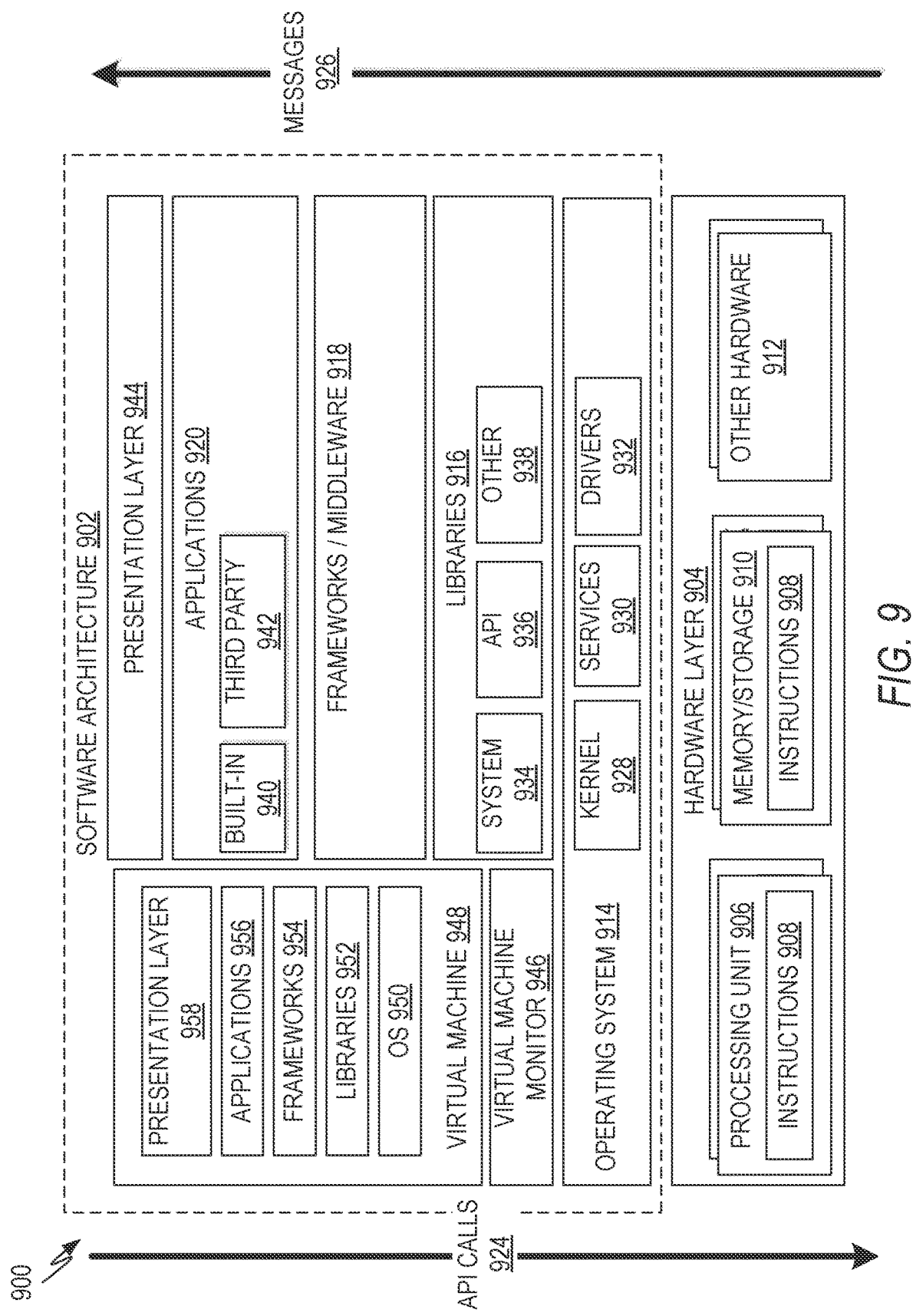
FIG. 9 is a block diagram illustrating an example of a software architecture that may be installed on a machine, according to some example embodiments.

FIG. 9 is a block diagram 900 illustrating a representative software architecture 902, which may be used in conjunction with various hardware architectures herein described. FIG. 9 is merely a non-limiting example of a software architecture, and it will be appreciated that many other architectures may be implemented to facilitate the functionality described herein. The software architecture 902 may be executing on hardware such as a machine 1000 of FIG. 10 that includes, among other things, processors 1010, memory 1030, and I/O components 1050. A representative hardware layer 904 is illustrated and can represent, for example, the machine 1000 of FIG. 10. The representative hardware layer 904 comprises one or more processing units 906 having associated executable instructions 908. The executable instructions 908 represent the executable instructions of the software architecture 902, including implementation of the methods, modules, and so forth of FIGS. 1-8. The hardware layer 904 also includes memory or storage modules 910, which also have the executable instructions 908. The hardware layer 904 may also comprise other hardware 912, which represents any other hardware of the hardware layer 904, such as the other hardware illustrated as part of the machine 1000.

In the example architecture of FIG. 9, the software architecture 902 may be conceptualized as a stack of layers, where each layer provides particular functionality. For example, the software architecture 902 may include layers such as an operating system 914, libraries 916, frameworks/middleware 918, applications 920, and a presentation layer 944. Operationally, the applications 920 or other components within the layers may invoke API calls 924 through the software stack and receive a response, returned values, and so forth (illustrated as messages 926) in response to the API calls 924. The layers illustrated are representative in nature, and not all software architectures have all layers. For example, some mobile or special purpose operating systems may not provide a frameworks/middleware 918 layer, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than by interfacing directly with the underlying operating system 914 functionality (e.g., kernel 928, services 930, or drivers 932). The libraries 916 may include system 934 libraries (e.g., C standard library) that may provide functions such as memory allocation functions, string manipulation functions, mathematic functions, and the like. In addition, the libraries 916 may include API 936 libraries such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules.

The frameworks 918 (also sometimes referred to as middleware) may provide a higher-level common infrastructure that may be utilized by the applications 920 or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third party applications 942. Examples of representative built-in applications 940 may include, but are not limited to, a contacts application, a browser application, a book reader application, a location application, a media application, a messaging application, or a game application. The third party applications 942 may include any of the built-in applications, as well as a broad assortment of other applications. In a specific example, the third party application 942 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 942 may invoke the API calls 924 provided by the mobile operating system such as the operating system 914 to facilitate functionality described herein.

The applications 920 may utilize built-in operating system functions (e.g., kernel 928, services 930, or drivers 932), libraries (e.g., system 934, APIs 936, and other libraries 938), or frameworks/middleware 918 to create user interfaces to interact with users of the system. Alternatively, or additionally, in some systems, interactions with a user may occur through a presentation layer, such as the presentation layer 944. In these systems, the application/module "logic" can be separated from the aspects of the application/module that interact with the user.

Some software architectures utilize virtual machines. In the example of FIG. 9, this is illustrated by a virtual machine 948. A virtual machine creates a software environment where applications/modules can execute as if they were executing on a hardware machine e.g., the machine 1000 of FIG. 10, for example). A virtual machine is hosted by a host operating system (e.g., operating system 914) and typically, although not always, has a virtual machine monitor 946, which manages the operation of the virtual machine as well as the interface with the host operating system (e.g., operating system 914). A software architecture executes within the virtual machine 948, such as an operating system 950, libraries 952, frameworks/middleware 954, applications 956, or a presentation layer 958. These layers of software architecture executing within the virtual machine 948 can be the same as corresponding layers previously described or may be different.

Example Machine Architecture and Machine-Readable Medium

Figure 10:
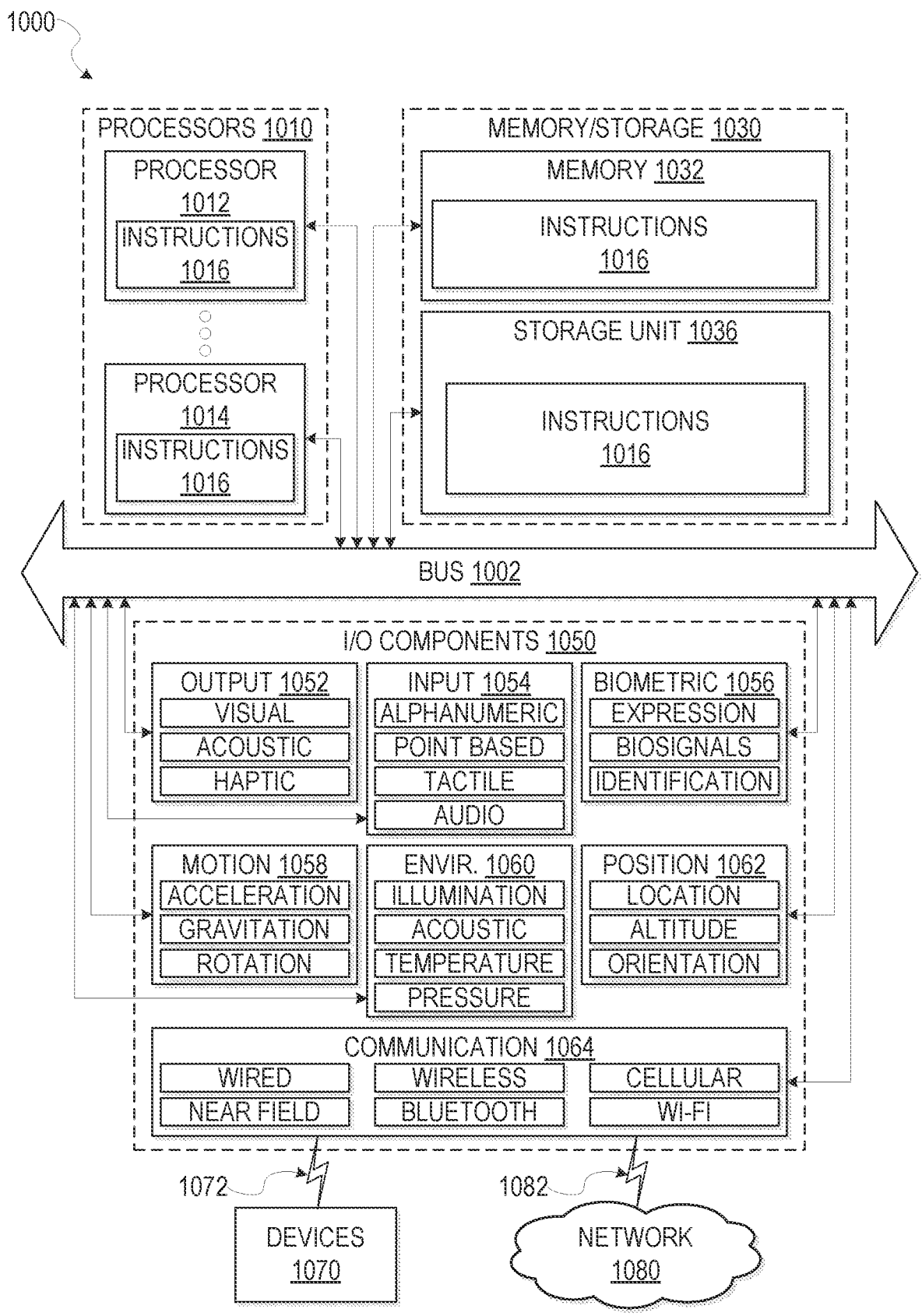
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions 1016 may cause the machine 1000 to execute the method 700 of FIG. 7. Additionally, or alternatively, the instructions 1016 may implement FIGS. 1-8, and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio- Frequency Integrated Circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and the memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), or any suitable combination thereof. The term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine (e.g., processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1070 may be another machine or any of a wide variety of peripheral devices (e.g., a peripheral device coupled via a USB).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1080 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer implemented method, comprising:
receiving, via a user interface, a listing title for an item being listed on an online marketplace;
determining, by one or more processors, a perplexity of the listing title and a plurality of expected perplexities for titles classified within a respective listing category of a plurality of categories;
calculating, by the one or more processors, a plurality of misclassification scores for the plurality of categories based at least on part on the perplexity of the listing title and the plurality of expected perplexities;
presenting, via the user interface, at least a subset of the plurality of categories based at least in part on the plurality of misclassification scores;
receiving a user selection of a first category of the subset of the plurality of categories; and
publishing a listing for the item on the online marketplace corresponding to the first category.

2. The method of claim 1, further comprising:
receiving, via the user interface, one or more item details for the item being listed;
providing, via the user interface, feedback based on the one or more item details received via the user interface; and
receiving, via the user interface, an alteration or an addition to the one or more item details.

3. The method of claim 1, wherein presenting, via the user interface, at least a subset of the plurality of categories further comprises:
presenting, via the user interface, the subset of the plurality of categories as an ordered list of suggested categories for the item being listed.

4. The method of claim 1, wherein presenting, via the user interface, at least a subset of the plurality of categories further comprises:
presenting confidence scores associated with the subset of the plurality of categories.

5. The method of claim 1, further comprising:
presenting, via the user interface, a sample item listing for comparison of the sample item listing and the item being listed.

6. The method of claim 1, wherein calculating the plurality of misclassification scores is based at least in part on one or more features of the item being listed.

7. The method of claim 6, wherein the one or more features comprise a product type of the item, a price of the item, a condition of the item, or any combination thereof.

8. A system, comprising:
a processor;
memory coupled with the processor; and
instructions stored in the memory and executable by the processor to cause the system to perform operations comprising:
receiving, via a user interface, a listing title for an item being listed on an online marketplace;
determining, by the processor, a perplexity of the listing title and a plurality of expected perplexities for titles classified within a respective listing category of a plurality of categories;
calculating, by the processor, a plurality of misclassification scores for the plurality of categories based at least on part on the perplexity of the listing title and the plurality of expected perplexities;
presenting, via the user interface, at least a subset of the plurality of categories based at least in part on the plurality of misclassification scores;
receiving a user selection of a first category of the subset of the plurality of categories; and
publishing a listing for the item on the online marketplace corresponding to the first category.

9. System of claim 8, wherein the instructions are further executable by the processor to cause the system to perform operations comprising:
receiving, via the user interface, one or more item details for the item being listed;
providing, via the user interface, feedback based on the one or more item details received via the user interface; and
receiving, via the user interface, an alteration or an addition to the one or more item details.

10. The system of claim 8, wherein the instructions to present, via the user interface, at least a subset of the plurality of categories are executable by the processor to cause the system to perform operations comprising:
presenting, via the user interface, the subset of the plurality of categories as an ordered list of suggested categories for the item being listed.

11. The system of claim 8, wherein the instructions to present, via the user interface, at least a subset of the plurality of categories are executable by the processor to cause the system to perform operations comprising:
presenting confidence scores associated with the subset of the plurality of categories.

12. The system of claim 8, wherein the instructions are further executable by the processor to cause the system to perform operations comprising:
presenting, via the user interface, a sample item listing for comparison of the sample item listing and the item being listed.

13. The system of claim 8, wherein the instructions to calculate the plurality of misclassification scores are executable by the processor to cause the system to perform operations comprising:
calculating the plurality of misclassification scores based at least in part on one or more features of the item being listed.

14. The system of claim 13, wherein the one or more features comprise a product type of the item, a price of the item, a condition of the item, or any combination thereof.

15. A non-transitory computer-readable medium storing code comprising instructions executable by a processor to cause a system to perform operations comprising:
receiving, via a user interface, a listing title for an item being listed on an online marketplace;
determining, by the processor, a perplexity of the listing title and a plurality of expected perplexities for titles classified within a respective listing category of a plurality of categories;
calculating, by the processor, a plurality of misclassification scores for the plurality of categories based at least on part on the perplexity of the listing title and the plurality of expected perplexities;
presenting, via the user interface, at least a subset of the plurality of categories based at least in part on the plurality of misclassification scores;
receiving a user selection of a first category of the subset of the plurality of categories; and
publishing a listing for the item on the online marketplace corresponding to the first category.

16. The non-transitory computer-readable medium of claim 15, wherein the instructions to present, via the user interface, at least a subset of the plurality of categories are executable by the processor to cause the system to perform operations comprising:
presenting, via the user interface, the subset of the plurality of categories as an ordered list of suggested categories for the item being listed.

17. The non-transitory computer-readable medium of claim 15, wherein the instructions are further executable by the processor to cause the system to perform operations comprising:
presenting, via the user interface, a sample item listing for comparison of the sample item listing and the item being listed.

* * * * *